(12) United States Patent
Henning et al.

(10) Patent No.: US 8,924,351 B2
(45) Date of Patent: Dec. 30, 2014

(54) METHOD AND APPARATUS TO SHARE A SINGLE STORAGE DRIVE ACROSS A LARGE NUMBER OF UNIQUE SYSTEMS WHEN DATA IS HIGHLY REDUNDANT

(71) Applicant: LSI Corporation, Milpitas, CA (US)

(72) Inventors: Brett J. Henning, Colorado Springs, CO (US); Scott W. Dominguez, Colorado Springs, CO (US); Jason C. McGinley, Castle Rock, CO (US)

(73) Assignee: LSI Corporation, San Jose, CA (US)

( * ) Notice: Subject to any disclaimer, the term of this patent is extended or adjusted under 35 U.S.C. 154(b) by 97 days.

(21) Appl. No.: 13/715,465

(22) Filed: Dec. 14, 2012

(65) Prior Publication Data
US 2014/0172797 A1 Jun. 19, 2014

(51) Int. Cl.
*G06F 7/00* (2006.01)
*G06F 17/30* (2006.01)

(52) U.S. Cl.
CPC .................. *G06F 17/30174* (2013.01)
USPC ........... 707/636; 707/821; 707/822; 707/827; 713/2

(58) Field of Classification Search
CPC .................. G06F 17/30067; G06F 17/30129; G06F 17/30174
USPC ....................... 707/636, 821, 822, 827; 713/2
See application file for complete search history.

(56) References Cited

U.S. PATENT DOCUMENTS

| | | | |
|---|---|---|---|
| 6,778,291 B1 * | 8/2004 | Clouthier | 358/1.16 |
| 2003/0126242 A1 * | 7/2003 | Chang | 709/222 |
| 2008/0005514 A1 * | 1/2008 | Kurokawa et al. | 711/163 |
| 2008/0082744 A1 * | 4/2008 | Nakagawa | 711/113 |
| 2008/0104381 A1 * | 5/2008 | Peacock et al. | 713/1 |
| 2008/0184218 A1 * | 7/2008 | Largman et al. | 717/168 |
| 2009/0083404 A1 | 3/2009 | Lenzmeier et al. | |
| 2009/0292737 A1 | 11/2009 | Hayton | |

* cited by examiner

*Primary Examiner* — Hares Jami
(74) *Attorney, Agent, or Firm* — Suiter Swantz pc llo

(57) ABSTRACT

A boot appliance for writing data to a particular host system's boot image and returning boot image data to a particular host system of a plurality of host systems. The boot appliance includes at least one storage medium, wherein the at least one storage medium is configured to store a base boot image and a plurality of variance boot images. The boot appliance further includes a buffer. The base boot appliance also includes a computer readable medium embodying computer code configured to cause the boot appliance to perform a method for writing data to a particular host system's boot image and for returning boot image data to a particular host system of a plurality of host systems.

20 Claims, 5 Drawing Sheets

METHOD AND APPARATUS TO SHARE A SINGLE STORAGE DRIVE ACROSS A LARGE NUMBER OF UNIQUE SYSTEMS WHEN DATA IS HIGHLY REDUNDANT

FIELD OF THE INVENTION

Embodiments of the invention are directed generally toward a method and apparatus for consolidating redundant data on a storage device and sharing the storage device among a plurality of host systems.

BACKGROUND

In certain server systems, operating system (OS) boot data is rarely used after the initial boot and application loading process. During the boot process the vast majority of the input/output (IO) accesses are read IOs. After an initial startup, the IO accesses to the OS are generally very low. Therefore, it would be desirable to provide a method, system, and apparatus to reduce the total cost of ownership of boot devices and reduce the required storage capacity for operating system boot data.

SUMMARY

Accordingly, a method is included for writing data to a particular host system's boot image, wherein the particular host system's boot image is based upon a base boot image and a particular variance boot image of a plurality of variance boot images. The method includes receiving write data for the particular host system's boot image, wherein the received write data is associated with a location of the particular host system's boot image. The method further includes reading data from the base boot image, wherein a location of the data read from the base boot image corresponds to the location associated with the received write data for the particular host system's boot image. The method also includes comparing the received write data to the data read from the base boot image. The method further includes determining whether a portion of the received write data is different from the data read from the base boot image. Also, the method includes writing the portion of the received write data in the particular variance boot image upon a determination that the portion of the received write data is different from the base boot image.

Additionally, a method is included for returning boot image data to a particular host system of a plurality of host systems. The method includes receiving a read request from the particular host system to read at least a portion of the particular host system's boot image, wherein the particular host system's boot image is based upon a base boot image and a particular variance boot image associated with the particular host system. The method also includes determining if any data blocks of the read request are located in the particular variance boot image. Additionally, the method includes reading at least one block from the base boot image, the at least one block from the base boot image corresponding to one or more data blocks of the read request which are not contained in the particular variance boot image. The method further includes reading at least one block from the particular variance boot image upon a determination that at least one data block of the read request is located in the particular variance boot image. The method additionally includes merging the at least one block from the base boot image and the at least one block from the particular variance boot image into merged read data. The method further includes returning the merged read data to the particular host.

An embodiment also comprises a boot appliance for writing data to a particular host system's boot image and returning boot image data to a particular host system of a plurality of host systems. The boot appliance includes at least one storage medium, wherein the at least one storage medium is configured to store a base boot image and a plurality of variance boot images. The boot appliance further includes a buffer. The base boot appliance also includes a computer readable medium embodying computer code configured to cause the boot appliance to perform a method for writing data to a particular host system's boot image and returning boot image data to a particular host system of a plurality of host systems.

It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include a method, device, software or firmware, service (such as a cloud boot service or remote boot service), and/or system in which a common (e.g., shared, utilizable, and/or accessible by multiple hosts) operating system (or boot device) is used to boot multiple host systems and load required applications. Because input/output (IO) accesses to the operating system (OS) are generally very low after an initial startup, embodiments of the invention reduce the total cost of ownership by consolidating redundant data and sharing a device (such as a boot device or boot appliance) among a large number of systems. For a plurality of host systems running on the same operating system, the data stored by each OS image is mostly common.

Additionally, if the data of a boot device is required to be redundant (such as through a Redundant Array of Independent Drives (RAID)), then embodiments of the invention reduce the total cost of ownership for each system by an additional factor corresponding to the type of redundancy implementation (e.g., the total cost of ownership of a RAID1 (with mirrored redundancy) implementation would be reduced by a factor of 2). Embodiments of the invention reduce the total cost of ownership for systems in which two or more servers are required by creating a new, sharable boot device or boot appliance.

Embodiments of the invention allow for servicing a large quantity of host systems using a single set of shared storage drives. Embodiments reduce the amount of time it takes to perform maintenance cycles in RAID-implemented systems; for example, if a RAID volume must be rebuilt, the reduced storage size of the embodied boot appliance results in a faster rebuild time than a device having a full OS boot image (with RAID redundancy) for each host system. Embodiments also allow a higher quantity of and/or a higher density of host systems to be operably connected to a single boot appliance. Similarly, an embodied system supports more host systems (and is expandable to support even more systems) as compared to other boot devices using a same amount of storage; this also results in a lower total cost of ownership. Furthermore, embodiments of the invention reduce the physical "footprint" of a system because a large number of host systems can be supported by a single boot appliance rather than multiple hardware devices, as would otherwise be required.

Figure 1:
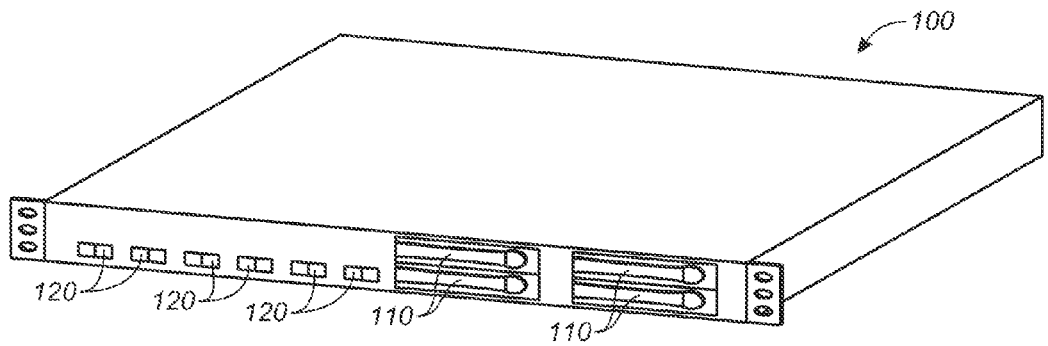
FIG. 1 shows an exemplary boot appliance of embodiments of the invention.
Figure 2:
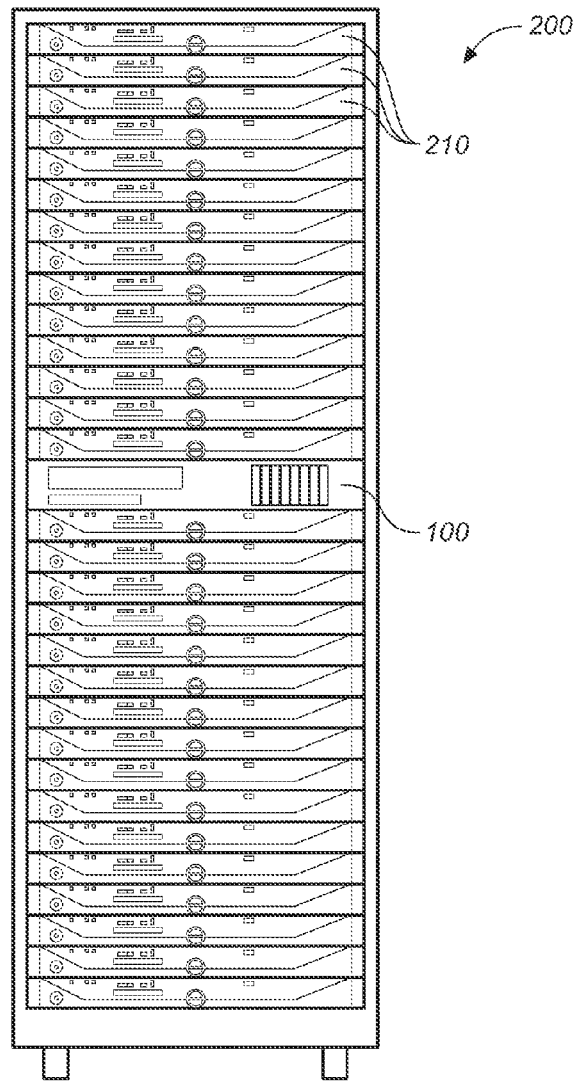
FIG. 2 shows a server rack.

Referring to FIGS. 1 and 2, embodiments of the invention include a boot appliance 100. In some embodiments, the boot appliance 100 comprises a housing configured to slide into a server rack 200 as shown in FIG. 2. For example, in an embodiment the boot appliance 100 comprises a standalone, 1 U (1 rack unit) "hyperscale" rack mountable boot appliance configured to mount in a server rack 200. Embodiments of the boot appliance 100 include one or more storage media 110 (such as one or more hard disk drives, solid state drives, or the like), ports 120 (such as SATA (Serial ATA) ports, SCSI (Small Computer System Interface) ports, fibre channel ports, SAS ports (Serial Attached SCSI) ports, or the like), and the like. Some embodiments of the boot appliance further include firmware, software, a controller, a buffer, a cache, a network card, a processor, a receiver/transmitter, and/or the like. In some embodiments the one or more storage media 110 comprise one or more removable storage drives. While the embodiment of the boot appliance 100 shown in FIG. 1 depicts the boot appliance 100 as having four removable storage drives 110, it is fully contemplated that the boot appliance 100 can include any number of removable storage drives 110 and any type of removable storage drives 110. The ports 120 are configured to communicatively couple host systems 310 to the boot appliance 100 and elements of the boot appliance, such as the one or more storage media 110 of the boot appliance.

Figure 3:
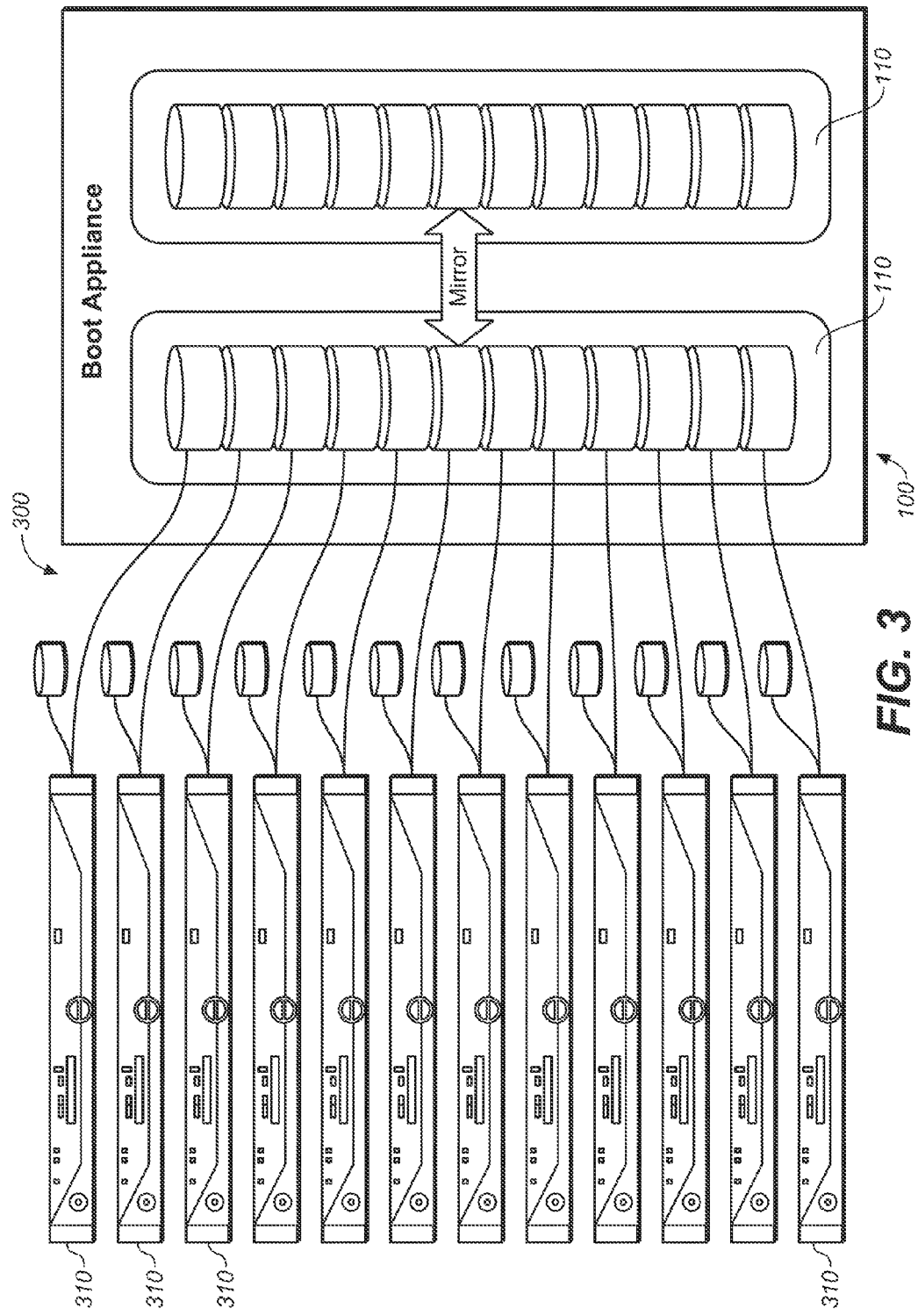
FIG. 3 shows a multiple host system topology including a boot appliance.
Figure 4:
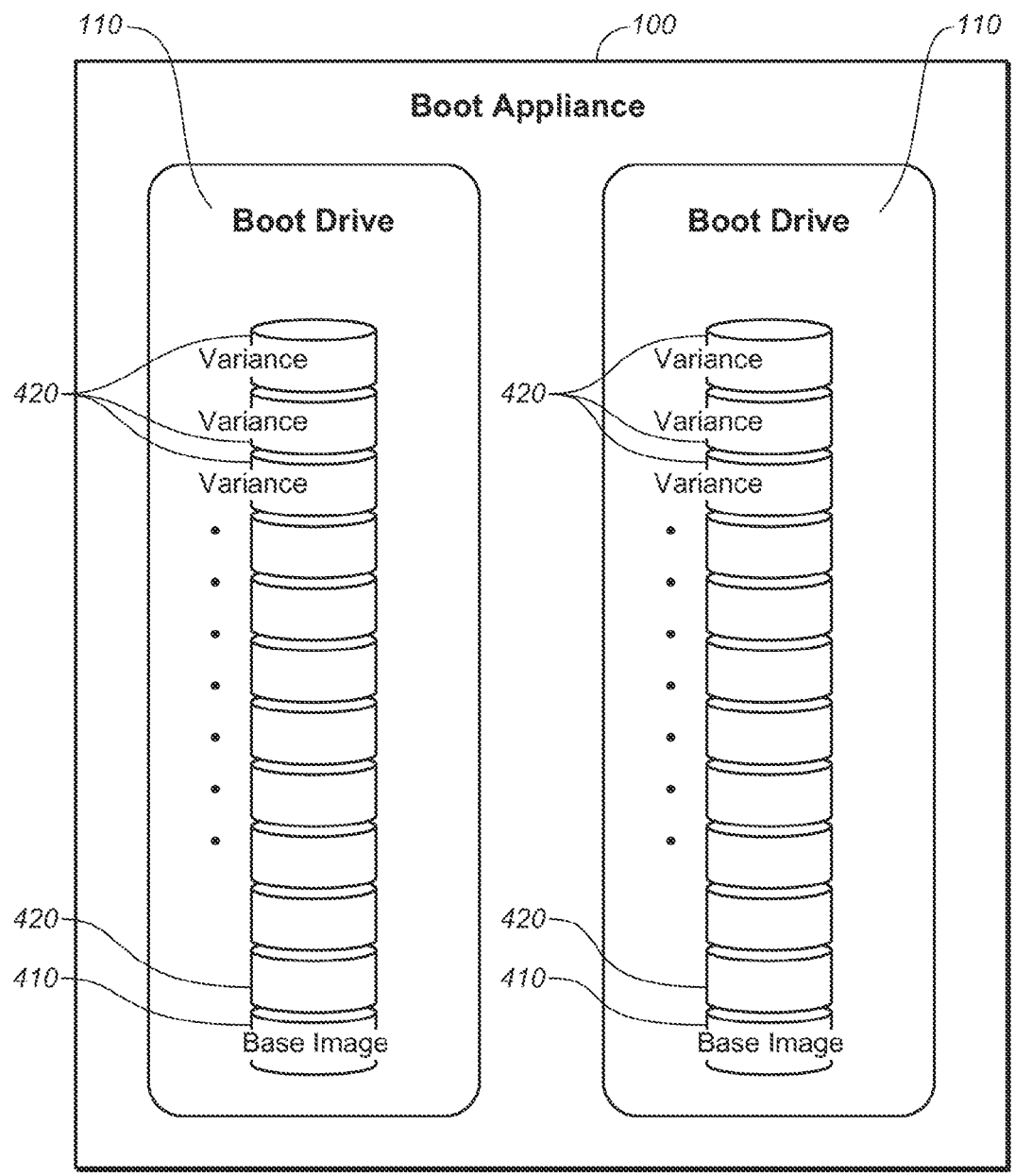
FIG. 4 shows boot drives of a boot appliance.

Referring to FIGS. 3 and 4, a system topology 300 of a boot appliance 100 communicatively coupled to a plurality of host systems 310 is depicted. The boot appliance 100, as depicted, includes a first boot drive 110 and a second boot drive 110. The boot images of the first boot drive 110 can be mirrored (or otherwise redundantly implemented, such as through a RAID implementation) on a second boot drive 110. The first boot drive 110 is configured to store and maintain boot images for each of the plurality of host systems 310. Embodiments of the invention include the first boot drive 110 including a base boot image 410 and a plurality of variance boot images 420, wherein each of the plurality of variance boot images 420 corresponds to a particular host system of the plurality of host systems 310. The boot appliance 100 is configured to provide each host system with a particularized (such as a unique or a semi-unique) boot image based upon the base boot image and the particular host system's corresponding variance boot image.

In embodiments of the invention, the boot appliance 100 is configured to store data (e.g., boot data or operating system data) in at least two areas. The first area is a single base image 410, which is a read-only area that is approximately equal to the disk capacity that is reported to each host system. At least a second area is a variance image 420, for which there will be one variance image 420 for each drive image resulting in a total variance image size of ([Size Of Variance Image]* [Number Of Images]). In some embodiments, variance images are uniformly sized, while in other embodiments, the variance images are non-uniformly sized. In preferred embodiments, the size of each variance image 420 is approximately 5-10% of the size of the base image 410. Depending on particular system topology environments, in some embodiments the size of each variance image 420 is approximately 0.00001%-0.1%, 0.1%-1%, 1-5%, 5-6%, 6-7%, 7-8%, 8-9%, 9-10%, 10-15%, 15-25%, 25-60%, or in a similar percentage range of the base image 410.

In some embodiments of the invention, the boot appliance 100 is configured such that a user or automated process installs an operating system image to the base image 410. Embodiments of the invention further include the boot appliance 100 being configured for all maintenance to be performed against the base image 410; that is, performing maintenance on base boot image 410 performs maintenance for the boot image for all of the host systems which use the boot appliance 100.

In some embodiments, the firmware of the boot appliance 100 maintains a substitution table (such as a substitution list) for each variance image 420. The substitution table maps or logs some or all data written by each operating system or host system by tracking or monitoring the logical block addresses directed to be written in the base image 410 to the available space in the variance image 420 associated with the particular host system of the I/O request. That is, the firmware maintains a substitution table of all writes (or other modifications, deletions, or the like) of data to a location of a particular host system's variance boot image 420 as being associated with a location of the base boot image 410.

Figure 5:
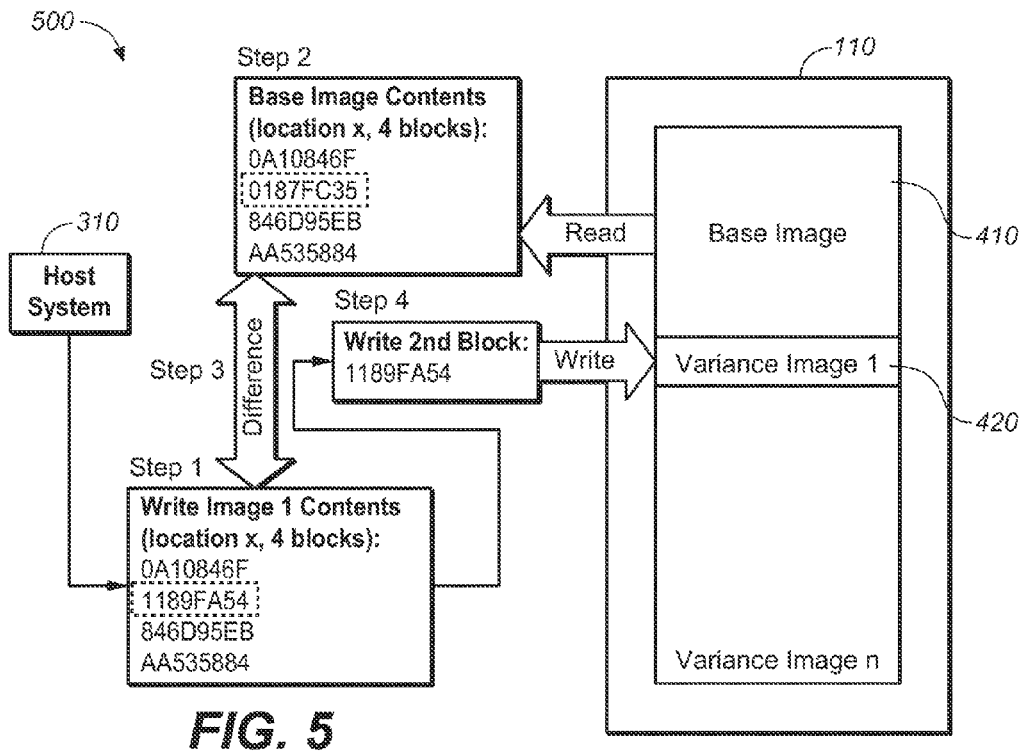
FIG. 5 shows a flow diagram of a write operation.

Referring to FIG. 5, an exemplary write operation 500 to a boot image of a boot appliance 100 is depicted. If a host system 310 writes data to its boot image, the data being written is compared to the data in the base image 410. If the firmware detects a difference in the data, the different portions are stored in the variance image section 420 of the boot drive 110, and the substitution list is updated to indicate that the location written (e.g., in logical block address form) has been updated with the data stored at the specified location in the variance image 420. If a write is sent that will cause the capacity of the variance image portion of the disk to be exceeded, then an error indicating that writes are no longer allowed will be returned. Referring still to FIG. 5, the following steps to an exemplary write operation are demonstrated.

Step 1. The host system 310 issues a four block write to location x.

Step 2. The firmware of the boot appliance 100 reads these four blocks from the base image 410.

Step 3. The data from the host 310 is compared to the data read from the base image 410.

Step 4. Upon the determination of one or more differences, that data is written into the corresponding variance image 420 (here, "Variance Image 1"). The remainder of data of the write, which is not different from the base image, is not written. Additionally, a returned status for the write command is based on the write of the variance image 420 only and not on the data which is the same as the data of the base image 410. If the variance image 420 is full during this write, the firmware of the boot appliance 100 returns an error notification.

Figure 6:
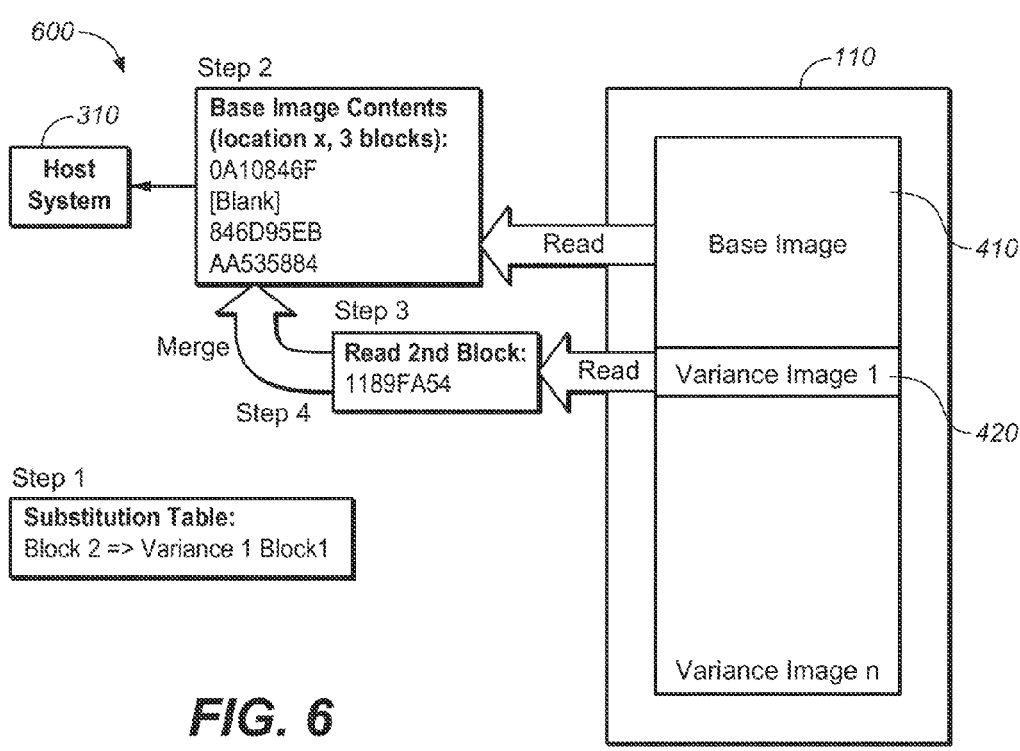
FIG. 6 shows a flow diagram of a read operation.

Referring to FIG. 6, an exemplary read operation 600 of a boot image of a boot appliance 100 is depicted. When a host system 310 reads this portion of the drive image, the firmware of the boot appliance 100 checks a substitution table to determine if any of the storage blocks of the read request are stored in the variance image 420. The firmware of the boot appliance 100 then builds the response data by using the base image 410 and by substituting in blocks from the variance image 420 for blocks of the base image 410. The firmware of the boot appliance returns the merged read data to the particular host system 310. The data returned to the particular host system 310 appears to be data that was stored in a contiguous fashion and from a single image, even though the read data came partially from the base image 410 and the variance image 420. Referring still to FIG. 6, the following steps of a read operation are demonstrated.

Step 1. The firmware consults the substitution table to determine that out of the requested section of storage, the second block is in variance image 1, block 1.

Step 2. The firmware reads three blocks from the base image 410 at the proper location.

Step 3. The firmware reads one block from variance image 1.

Step 4. The firmware merges the block from the variance image into the data from the base image 410. This merged data is returned to the host.

Embodiments of the invention a decompression stage where variances are scanned for identical portions of data (such as identical blocks). Performing decompression of the variance images can include performing a total occurrence decompression or a partial occurrence decompression. Performing a total occurrence decompression comprises: determining that all of the variance images have identical data in the same block; moving the identical data to the base image block; and freeing the particular block of each of the variance images. Performing a partial occurrence decompression comprises determining that some (but not all) of the variance images have identical data in the same block; moving the data of the particular block back to the base image; and updating the other variance images (which are not in the group of variance images having identical data in the particular block) with proper data (either left, as is, if a particular variance image already contained a changed (but not decompressed) block, or written with the data previously from the base image).

In some embodiments, because performing a partial occurrence decompression can be resource intensive, the firmware of the boot appliance 100 can be configured to only perform partial occurrence decompressions upon a determination that a predetermined percentage (e.g., 10%, 25%, 50%, 51%, 70%, 90%, or the like) of the variance images have blocks with identical data. In other embodiments, it is contemplated that the firmware only performs a decompression of the variance images upon a determination that the quantity (or percentage) of variance images that have identical data in a particular block exceeds the quantity (or percentage) of variance images which do not have data corresponding to the location of the particular block (i.e., the particular host system relies upon data from the base image for data at the particular block location rather than relying upon data from the variance image at that particular block location). In some embodiments of the invention, the firmware of the boot appliance 100 or the substitution table includes one or more information-tracking-mechanisms configured to aggregate, track, update, and/or correlate information about host systems which have identical variance image data at a particular block location, host systems which rely on the base image for the same particular block location, and/or host systems which have non-identical variance image data at the same particular block location. In some embodiments, the firmware of the boot appliance 100 determines whether to perform a decompression of the variance images based upon information from one or more information-tracking-mechanisms.

In some embodiments of the invention, it is contemplated that the boot appliance 100 will allow the boot drive 110 to contain only a predetermined and/or proportionally small amount of data differences for each variance image. For example, rather than supporting 24 full-size drive images each with a 100 units of storage (which requires a total capacity of 2400 units of storage), an example of an embodied boot appliance would supports 5 units of variance from the base image per variance image such that the boot appliance would only require 220 units of storage to provide a same number of drive images ([100 units for the base image]+([24 drive images]×[5 units per variance image])). As demonstrated by this example, embodiments of the invention provide more efficient use of storage space which results in the ability to use storage devices with smaller capacities or the ability to expand service to a significantly higher number of host systems without increasing storage capacity.

Figure 7:
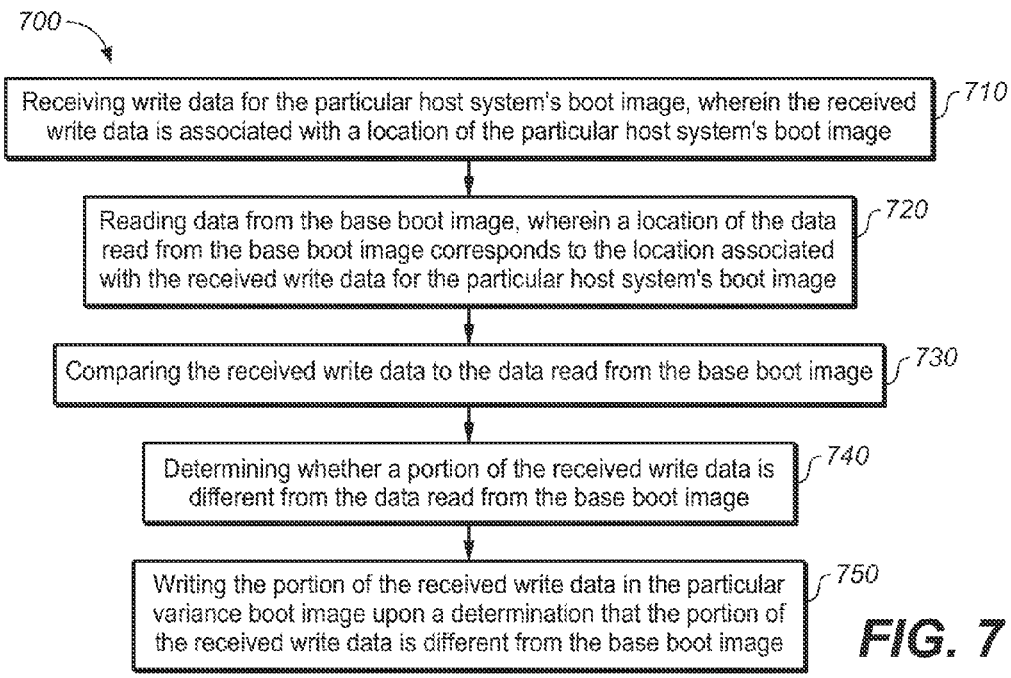
FIG. 7 shows an embodied method of the invention for writing.

Referring to FIG. 7, an embodiment of the invention includes a method 700 for writing data to a particular host system's boot image. The particular host system's boot image is based upon a base boot image and a particular variance boot image of a plurality of variance boot images. The particular variance boot image is associated with the particular host system. It is contemplated that embodiments of the method 700 can be performed by a boot appliance 100; components or modules of the boot appliance 100; software or firmware executed on a computing device (such as the boot appliance 100, a controller, or a processor); other computing devices; other computer components; or on other software, firmware, or middleware of the multiple host system topology. The method 700 can include any or all of steps 710, 720, 730, 740, or 750, and it is contemplated that the method 700 can include additional steps as disclosed throughout, but not explicitly set forth in this paragraph. Further, it is fully contemplated that the steps of the method 700 can be performed concurrently or in a non-sequential order. Likewise, it is fully contemplated that the method 700 can be performed prior to, subsequent to, or in combination with the performance of one or more steps of one or more other embodied methods disclosed throughout.

Some embodiments of the method 700 include a step 710, wherein the step 710 comprises receiving write data for the particular host system's boot image, wherein the received write data is associated with a location of the particular host system's boot image. Furthermore, in some embodiments, the step 710 comprises receiving write data from the particular host system for the particular host system's boot image, wherein the received write data is associated with a location of the particular host system's boot image. Further embodiments of the invention include a step (not shown) of storing the received write data in a buffer.

Some embodiments of the method 700 include a step 720, wherein the step 720 comprises reading data from the base boot image, wherein a location of the data read from the base boot image corresponds to the location associated with the received write data for the particular host system's boot image. In further embodiments, the step 720 comprises reading data from the base boot image to the buffer, wherein a location of the data read from the base boot image corresponds to the location associated with the received write data for the particular host system's boot image.

Some embodiments of the method 700 include a step 730, wherein the step 730 comprises comparing the received write data to the data read from the base boot image.

Some embodiments of the method 700 include a step 740, wherein the step 740 comprises determining whether a portion of the received write data is different from the data read from the base boot image.

Some embodiments of the method 700 include a step 750, wherein the step 750 comprises writing the portion of the received write data in the particular variance boot image upon a determination that the portion of the received write data is different from the base boot image.

Further embodiments of the method 700 include a step (not shown) of updating a substitution table, the substitution table being configured to map data of the particular variance boot image to corresponding locations of the base boot image.

Further embodiments of the method 700 include a step (not shown) of indicating to the particular host system a completion of writing data upon writing the portion of the received write data in the particular variance boot image. In additional embodiments, the step comprises indicating to the particular host system a completion of writing data upon writing the portion of the received write data in the particular variance boot image and without writing any portion of the write data to the base boot image.

Further embodiments of the method 700 include a step (not shown) of performing maintenance on multiple boot images of a plurality of host systems by modifying the base boot image. Additional embodiments include simultaneously performing maintenance on multiple boot images of a plurality of host systems by modifying the base boot image and updating the substitution table.

Still further embodiments of the method 700 include performing a decompression of the plurality of variance images.

Figure 8:
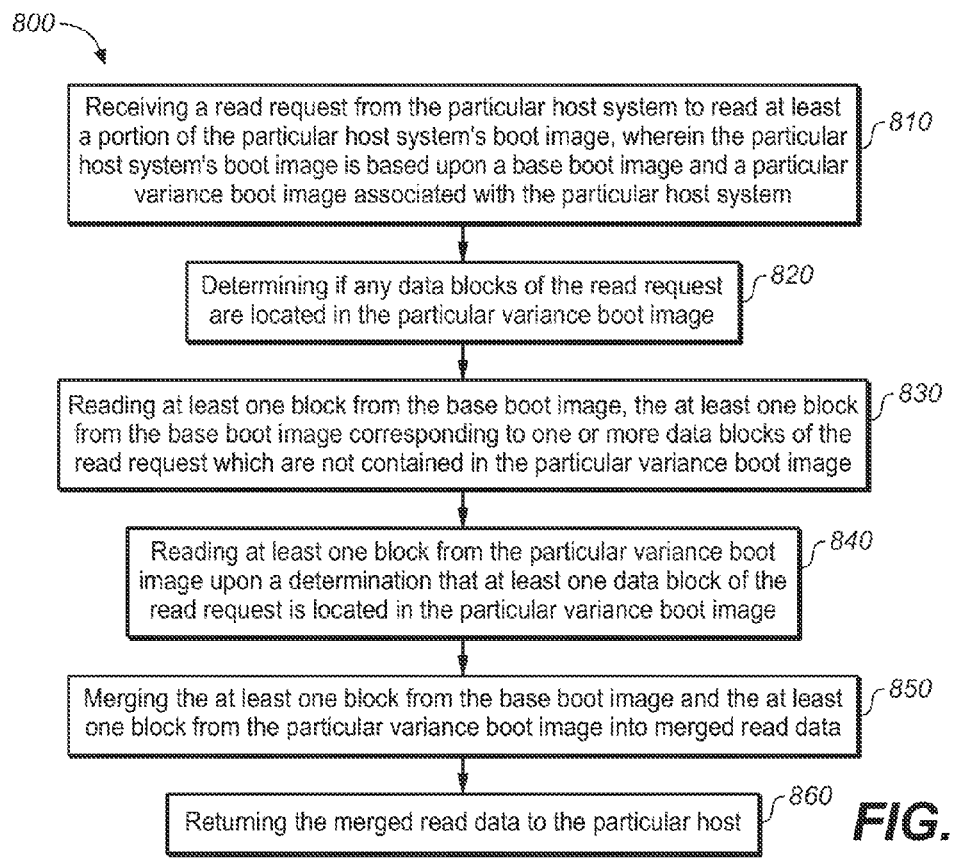
FIG. 8 shows an embodied method of the invention for reading.

Referring to FIG. 8, an embodiment of the invention includes a method 800 for returning boot image data to a particular host system of a plurality of host systems. It is contemplated that embodiments of the method 800 can be performed by a boot appliance 100; components or modules of the boot appliance 100; software or firmware executed on a computing device (such as the boot appliance 100, a controller, or a processor); other computing devices; other computer components; or on other software, firmware, or middleware of the multiple host system topology. The method 800 can include any or all of steps 810, 820, 830, 840, 850, or 860, and it is contemplated that the method 800 can include additional steps as disclosed throughout, but not explicitly set forth in this paragraph. Further, it is fully contemplated that the steps of the method 800 can be performed concurrently or in a non-sequential order. Likewise, it is fully contemplated that the method 800 can be performed prior to, subsequent to, or in combination with the performance of one or more steps of one or more other embodied methods disclosed throughout.

Some embodiments of the method 800 include a step 810, wherein the step 810 comprises receiving a read request from the particular host system to read at least a portion of the particular host system's boot image, wherein the particular host system's boot image is based upon a base boot image and a particular variance boot image associated with the particular host system.

Some embodiments of the method 800 include a step 820, wherein the step 820 comprises determining if any data blocks of the read request are located in the particular variance boot image. In further embodiments, the step 820 comprises checking a substitution table to determine if any data blocks of the read request are located in the particular variance boot image. Embodiments include the substitution table being configured to map data of the particular variance boot image to corresponding locations of the base boot image.

Some embodiments of the method 800 include a step 830, wherein the step 830 comprises reading at least one block from the base boot image, the at least one block from the base boot image corresponding to one or more data blocks of the read request which are not contained in the particular variance boot image.

Some embodiments of the method 800 include a step 840, wherein the step 840 comprises reading at least one block from the particular variance boot image upon a determination that at least one data block of the read request is located in the particular variance boot image.

Some embodiments of the method 800 include a step 850, wherein the step 850 comprises merging the at least one block from the base boot image and the at least one block from the particular variance boot image into merged read data.

Some embodiments of the method 800 include a step 860, wherein the step 860 comprises returning the merged read data to the particular host. In further embodiments, the step 860 comprises returning the merged read data to the particular host system as being from a dedicated boot image.

Further embodiments of the method 800 include a step (not shown) of performing maintenance on multiple boot images of the plurality of host systems by modifying the base boot image and updating the substitution table Additional embodiments of the method 800 include the following steps (not shown): receiving a second read request from a second particular host system to read at least a portion of the second particular host system's boot image, wherein the second particular host system's boot image is based upon the base boot image and a second particular variance boot image associated with the second particular host system; determining if any data blocks of the second read request from the second particular host system are located in the second particular variance boot image; reading at least one block from the base boot image, the at least one block from the base boot image corresponding to one or more data blocks of the second read request which are not contained in the second particular variance boot image; reading at least one block from the second particular variance boot image upon a determination that at least one data block of the second read request is located in the second particular variance boot image; merging the at least one block from the base boot image and the at least one block from the second particular variance boot image into merged read data; and returning the merged read data to the second particular host system.

It is believed that the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for writing data to a particular host system's boot image, wherein the particular host system's boot image is based upon a base boot image and a particular variance boot image of a plurality of variance boot images, the particular variance boot image being associated with the particular host system, the method comprising:

receiving write data for the particular host system's boot image, wherein the received write data is associated with a location of the particular host system's boot image;

reading data from the base boot image, wherein a location of the data read from the base boot image corresponds to the location associated with the received write data for the particular host system's boot image;

merging at least one block from the base boot image and at least one block from the particular variance boot image into merged read data by substituting the at least one block from the particular variance boot image into one or more blocks of the base boot image;

comparing the received write data to the data read from the base boot image;

determining whether a portion of the received write data is different from the data read from the base boot image;

writing the portion of the received write data in the particular variance boot image upon a determination that the portion of the received write data is different from the base boot image; and performing a decompression of the plurality of variance images.

2. The method of claim 1, wherein receiving write data for the particular host system's boot image, wherein the received write data is associated with a location of the particular host system's boot image, further comprises:

receiving write data from the particular host system for the particular host system's boot image, wherein the received write data is associated with a location of the particular host system's boot image.

3. The method of claim 2, further comprising:

indicating to the particular host system a completion of writing data upon writing the portion of the received write data in the particular variance boot image.

4. The method of claim 3, wherein indicating to the particular host system a completion of writing data upon writing the portion of the received write data in the particular variance boot image further comprises:

indicating to the particular host system a completion of writing data upon writing the portion of the received write data in the particular variance boot image and without writing any portion of the write data to the base boot image.

5. The method of claim 1, further comprising:

storing the received write data in a buffer.

6. The method of claim 5, wherein reading data from the base boot image, wherein a location of the data read from the base boot image corresponds to the location associated with the received write data for the particular host system's boot image, further comprises:

reading data from the base boot image to the buffer, wherein a location of the data read from the base boot image corresponds to the location associated with the received write data for the particular host system's boot image.

7. The method of claim 1, further comprising:

performing maintenance on multiple boot images of a plurality of host systems by modifying the base boot image.

8. The method of claim 1, further comprising:

updating a substitution table, the substitution table being configured to map data of the particular variance boot image to corresponding locations of the base boot image.

9. The method of claim 8, further comprising:

performing maintenance on multiple boot images of a plurality of host systems by modifying the base boot image and updating the substitution table.

10. The method of claim 1, wherein performing a decompression of the plurality of variance images further comprises:

performing a total occurrence decompression of the plurality of variance images, wherein performing the total occurrence decompression of the plurality of variance images comprises:

determining that all of the plurality of variance images have identical data in a particular block of each of the plurality of variance images;

moving the identical data to a block of the base boot image; and freeing the particular block of each of the plurality of variance images.

11. The method of claim 1, wherein performing a decompression of the plurality of variance images further comprises:

performing a partial occurrence decompression of the plurality of variance images, wherein performing the partial occurrence decompression of the plurality of variance images comprises:

determining that some of the plurality of variance images have identical data in a particular block;

moving the identical data of the particular block to the base boot image; and updating other variance images having non-identical data in the particular block.

12. The method of claim 11, wherein determining that some of the plurality of variance images have identical data in a particular block further comprises:

determining that at least a predetermined percentage of the plurality of variance images have identical data in a particular block.

13. A method for returning boot image data to a particular host system of a plurality of host systems, the method comprising:

receiving a read request from the particular host system to read at least a portion of the particular host system's boot image, wherein the particular host system's boot image is based upon a base boot image and a particular variance boot image associated with the particular host system;

determining if any data blocks of the read request are located in the particular variance boot image;

reading at least one block from the base boot image, the at least one block from the base boot image corresponding to one or more data blocks of the read request which are not contained in the particular variance boot image;

reading at least one block from the particular variance boot image upon a determination that at least one data block of the read request is located in the particular variance boot image;

merging the at least one block from the base boot image and the at least one block from the particular variance boot image into merged read data by substituting the at least one block from the particular variance boot image into one or more blocks of the base boot image; and returning the merged read data to the particular host.

14. The method of claim 13, wherein determining if any data blocks of the read request are located in the particular variance boot image further comprises:

checking a substitution table to determine if any data blocks of the read request are located in the particular variance boot image.

15. The method of claim 14, wherein the substitution table is configured to map data of the particular variance boot image to corresponding locations of the base boot image.

16. The method of claim 13, wherein returning the merged read data to the particular host system as being from a single boot image further comprises:

returning the merged read data to the particular host system as being from a dedicated boot image.

17. The method of claim 13, further comprising:
receiving a second read request from a second particular host system to read at least a portion of the second particular host system's boot image, wherein the second particular host system's boot image is based upon the base boot image and a second particular variance boot image associated with the second particular host system;
determining if any data blocks of the second read request from the second particular host system are located in the second particular variance boot image;
reading at least one block from the base boot image, the at least one block from the base boot image corresponding to one or more data blocks of the second read request which are not contained in the second particular variance boot image;
reading at least one block from the second particular variance boot image upon a determination that at least one data block of the second read request is located in the second particular variance boot image;
merging the at least one block from the base boot image and the at least one block from the second particular variance boot image into merged read data by substituting the at least one block from the second particular variance boot image into one or more blocks of the base boot image; and
returning the merged read data to the second particular host system.

18. The method of claim 13, further comprising:
performing maintenance on multiple boot images of the plurality of host systems by modifying the base boot image and updating the substitution table.

19. A boot appliance for writing data to a particular host system's boot image and returning boot image data to a particular host system of a plurality of host systems, comprising:
at least one storage medium, wherein the at least one storage medium is configured to store a base boot image and a plurality of variance boot images;
a buffer;
a computer readable medium embodying computer code configured to cause the boot appliance to perform a method for:
writing data to a particular host system's boot image, wherein writing data to a particular host system's boot image further comprises:
receiving write data for the particular host system's boot image, wherein the received write data is associated with a location of the particular host system's boot image;
reading data from the base boot image, wherein a location of the data read from the base boot image corresponds to the location associated with the received write data for the particular host system's boot image;
comparing the received write data to the data read from the base boot image;
determining whether a portion of the received write data is different from the data read from the base boot image; and
writing the portion of the received write data in the particular variance boot image upon a determination that the portion of the received write data is different from the base boot image; and
returning boot image data to a particular host system of a plurality of host systems, wherein returning boot image data to a particular host system of a plurality of host systems further comprises:
receiving a read request from the particular host system to read at least a portion of the particular host system's boot image, wherein the particular host system's boot image is based upon a base boot image and a particular variance boot image associated with the particular host system;
determining if any data blocks of the read request are located in the particular variance boot image;
reading at least one block from the base boot image, the at least one block from the base boot image corresponding to one or more data blocks of the read request which are not contained in the particular variance boot image;
reading at least one block from the particular variance boot image upon a determination that at least one data block of the read request is located in the particular variance boot image;
merging the at least one block from the base boot image and the at least one block from the particular variance boot image into merged read data by substituting the at least one block from the particular variance boot image into one or more blocks of the base boot image; and
returning the merged read data to the particular host.

20. The boot appliance of claim 19, wherein a size of the particular variance boot image is approximately 5 to 20 percent of a size of the base boot image.

* * * * *